(12) United States Patent
Al-Walaie et al.

(10) Patent No.: US 9,641,245 B2
(45) Date of Patent: May 2, 2017

(54) SYSTEM, METHOD, AND APPARATUS FOR DAISY CHAIN NETWORK PROTECTION FROM NODE MALFUNCTION OR POWER OUTAGE

(71) Applicant: Saudi Arabian Oil Company, Dhahran (SA)

(72) Inventors: Soliman A. Al-Walaie, Dammam (SA); Muhammad S. Aljuaid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 72 days.

(21) Appl. No.: 14/709,984

(22) Filed: May 12, 2015

(65) Prior Publication Data
US 2016/0337732 A1 Nov. 17, 2016

(51) Int. Cl.
*H04B 10/08* (2006.01)
*H04B 10/077* (2013.01)
(Continued)

(52) U.S. Cl.
CPC ....... *H04B 10/0771* (2013.01); *H04B 10/032* (2013.01); *H04L 41/0672* (2013.01); *H04Q 11/0062* (2013.01); *H04Q 2011/0081* (2013.01)

(58) Field of Classification Search
CPC ............ H04B 17/0022; H04B 17/0025; H04B 17/003; H04B 10/032; H04B 10/0771
See application file for complete search history.

(56) References Cited

U.S. PATENT DOCUMENTS 5,095,515 A 3/1992 Seaver
6,477,288 B1 11/2002 Sato
(Continued)

FOREIGN PATENT DOCUMENTS

EP 1720293 A1 11/2006
JP 1155700 A 2/1999

OTHER PUBLICATIONS

Miller, "An Electromagnetic MEMs 2×2 Fiber Optic Bypass Switch", International Conference on Solid-State Sensors and Actuators, Chicago, Jun. 16-19, 1997, pp. 89-92.
(Continued)

*Primary Examiner* — Dzung Tran
(74) *Attorney, Agent, or Firm* — Bracewell LLP; Constance G. Rhebergen; Christopher L. Drymalla

(57) ABSTRACT

Systems, methods, and apparatuses for protecting daisy chain networks from node malfunction or power outage are disclosed. One or more communication nodes in a daisy chain network can be bypass-capable communication nodes. Bypass-capable communication nodes can include a sensing and switching subsystem, embedded in the node or external to the node in a fiber optic cable running along the daisy chain network. In embodiments, the sensing and switching subsystem can responsively switch the bypass-capable communication node from communication node primary circuitry to primary circuitry responsive to node malfunction or node power outage. The sensing and switching subsystem also can switch back from bypass circuitry to primary circuitry responsive to restoration of node function or node power. In embodiments, switching occurs responsive to excitation or de-excitation of the node itself.

27 Claims, 7 Drawing Sheets

(51) Int. Cl.
    *H04B 10/032*    (2013.01)
    *H04L 12/24*    (2006.01)
    *H04Q 11/00*    (2006.01)

(56) References Cited

U.S. PATENT DOCUMENTS

| | | | |
|---|---|---|---|
| 6,647,174 | B2 | 11/2003 | Gooding et al. |
| 6,912,337 | B2 | 6/2005 | Carberry et al. |
| 2006/0159388 | A1* | 7/2006 | Kawase .................. G02B 6/352 385/16 |
| 2006/0188260 | A1 | 8/2006 | Nikolopoulos et al. |
| 2006/0250947 | A1* | 11/2006 | Allen ................ H04L 12/40182 370/216 |
| 2007/0201873 | A1 | 8/2007 | Buabbud et al. |
| 2008/0310298 | A1 | 12/2008 | Drange |
| 2010/0315942 | A1 | 12/2010 | Jackson et al. |
| 2014/0204749 | A1* | 7/2014 | Sabato ................ H04L 47/6265 370/235 |
| 2014/0205285 | A1 | 7/2014 | Jiang |
| 2014/0241718 | A1 | 8/2014 | Jiang |
| 2015/0365338 | A1* | 12/2015 | Pannell ................ H04J 3/0635 370/412 |
| 2016/0212199 | A1* | 7/2016 | Dam .................. G05B 19/0423 |

OTHER PUBLICATIONS

International Search Report and Written Opinion for International Application No. PCT/US2016/031807; International Filing Date May 11, 2016; Report mail date Jul. 29, 2016. (pp. 1-12).

Japanese Publication JPH 1155700 Application Publication Date Feb. 26, 1999, Machine Translation (pp. 1-23).

\* cited by examiner

SYSTEM, METHOD, AND APPARATUS FOR DAISY CHAIN NETWORK PROTECTION FROM NODE MALFUNCTION OR POWER OUTAGE

BACKGROUND OF THE INVENTION

Field of the Invention

Embodiments of the invention relate to oil and gas exploration and transportation and, more particularly, to daisy chain optical networks deployed along linear facilities.

Description of Related Art

Network connectivity is an essential service to enable voice, data, and video applications. One connectivity model for cascaded sites and repeater shelters is the linear, daisy chain connectivity model. In this model, communication nodes are connected in series. Such a model is simple, scalable, and economical, but comes with several drawbacks. In particular, in the conventional daisy chain architecture, failure of a single communication node impacts subsequent communication nodes.

SUMMARY OF THE INVENTION

Applicant has recognized the need for the instantaneous and automatic self-healing protection of communication nodes. In addition, Applicant has recognized the need for connectivity protection against the failure of one or more communication nodes in a daisy chain architecture. Applicant further has recognized the need to protect offshore and onshore applications along pipelines from single and multiple points of failure at communication nodes positioned along the pipelines. Still further, Applicant has recognized the need for enhanced network reliability for supervisory control and data acquisition (SCADA) systems and other applications deployed in a linear network topology. Moreover, Applicant has recognized the need to reduce or eliminate the electromotive force issues encountered in the oil and gas exploration and transportation fields.

In view of the foregoing, embodiments of the present invention advantageously provide systems, apparatuses, methods, and computer media having computer programs stored therein (program products) to protect against points of failure in a daisy chain network. Embodiments of the invention advantageously reduce or eliminate the electromotive force by employing fiber optic cables in conjunction with other aspects of embodiments of the invention as will be discussed more fully herein. In addition, embodiments of the invention enhance network reliability for SCADA and other applications deployed in a linear network topology.

To accomplish these and other ends, embodiments of the invention include a daisy chain network deployed along a linear facility between a proximal site and one or more distal sites. Embodiments can include a plurality of communication nodes operably connected to one another in a daisy chain network. For example, the plurality of communication nodes can include a main site communication node being positioned at the proximal site, one or more remote site communication nodes being positioned at the one or more distal sites, and one or more intermediary communication nodes being positioned in the daisy chain network in a series between the main site communication node and the one or more remote site communication nodes. For ease of discussion, at times this application refers to a single proximal site and a single distal site, though it will be understood that any number of configurations in which communication nodes relay information from one site to another will be possible.

The one or more intermediary communication nodes can be configured to relay a transmission between the main site communication node and the remote site communication node. Each communication node can be characterized as upstream or downstream from a reference communication node. For example, an intermediary communication node positioned between a reference communication node and the remote site communication node can be characterized as upstream from the reference communication node. Meanwhile, an intermediary communication node positioned between the reference communication node and the main site communication node can be characterized as downstream from the reference communication node. The plurality of intermediary communication nodes can include a bypass-capable communication node. A bypass-capable communication node can be implemented as part of a broader system, although it is within the scope of the invention to make and use a bypass-capable communication node as a standalone apparatus.

A bypass-capable communication node can include a first transceiver in communication with an adjacent downstream communication node. The adjacent downstream communication node can include one of (i) the main site communication node, or (ii) an intermediary communication node downstream from the bypass-capable communication node. The bypass-capable communication node further can include a second transceiver in communication with an adjacent upstream communication node. The adjacent upstream communication node can include one of (i) the remote site communication node, or (ii) an intermediary communication node upstream from the bypass capable communication node. The bypass-capable communication node can include communication node primary circuitry configured to execute a node function. In addition, the communication node primary circuitry further can be configured to provide a primary communication path for a transmission segment of the transmission being relayed between the main site communication node and the remote site communication node. The transmission segment can include a transmission between the adjacent downstream communication node and the adjacent upstream communication node. Moreover, the bypass-capable communication node can include optical-electrical circuitry configured to transform an optical signal received by one or both of the transceivers into an electrical signal to transmit to the communication node primary circuitry. The optical-electrical circuitry further can be configured to transform an electrical signal received from the communication node primary circuitry into an optical signal for transmission by one or both of the transceivers.

Embodiments of the invention can include communication node bypass circuitry configured to provide a bypass communication path around the bypass-capable communication node for the transmission segment between the adjacent downstream communication node and the adjacent upstream communication node. An optical switch can be configured to switch the bypass-capable communication node from the communication node primary circuitry to the communication node bypass circuitry. In embodiments of the invention, the communication node bypass circuitry and the optical switch are internal components of the bypass-capable communication node. In embodiments of the invention, the communication node bypass circuitry and the optical switch are external elements to the bypass-capable communication node. For example, the communication node bypass circuitry and the optical switch can be embedded in, for example, the fiber optic cable or elsewhere in the linear facility.

Embodiments further can include an element to sense node power and functionality and make decisions regarding switching between communication node primary circuitry and communication node bypass circuitry. For example, embodiments can include one or more processors and tangible computer readable medium in communication with the one or more processors. The tangible computer readable medium can have stored therein a plurality of operational modules. Each of the operational modules can comprise a set of instructions that when executed cause the one or more processors to perform operations. The tangible computer readable medium can be part of a broader system, for example, as described herein. In addition, the tangible computer readable medium and the operational modules discloses herein can be made and used as a standalone program product. Moreover, it will be understood by one skilled in the art that the various operations disclosed herein as performed by the one or more processors can be executed as part of a computer implemented method within the scope of the invention.

The plurality of operational modules can include a bypass-capable communication node monitoring module configured to monitor the bypass-capable communication node and generate a first trigger event signal responsive to detection of a first trigger event. In embodiments, the first trigger event can be characterized by degradation of quality of the primary communication path below a predefined threshold. By detecting such degradation, the bypass-capable communication node at which degradation occurs can be classified as a point of failure in the daisy chain. As used in this application, the primary communication path refers to functionality of the primary communication path node. For example, degradation of quality of the primary communication path below a predefined threshold can include one or more of (i) degradation of communication node primary circuitry function below a predefined functional threshold, and (ii) degradation of bypass-capable communication node power below a predefined power threshold.

The plurality of operational modules further can include an optical switching module configured to optically switch the bypass-capable communication node from use of the communication node primary circuitry to use of the communication node bypass circuitry responsive to receipt of the first trigger event signal from the bypass-capable communication node monitoring module. In addition, the plurality of operational modules can include a control bypass module responsive to the optical switching module. The control bypass module can be configured to adaptively control internodal transmissions when the bypass-capable communication node is classified as a point of failure. That is, the control bypass module can be configured to control transmission parameters of transmissions between the adjacent upstream communication node and the adjacent downstream communication node. In embodiments, adaptive control (for example, coherent control) of the transmission signal (for example, the optical transmission signal) can control for attenuation and dispersion of the internodal transmissions caused by bypassing the bypass-capable communication node.

In embodiments of the invention, the optical switch further can be configured to switch from the communication node bypass circuitry to the communication node primary circuitry. In addition, the bypass-capable communication node monitoring module further can be configured to generate a second trigger event signal responsive to detection of a second trigger event. In embodiments, the second trigger event can be characterized by restoration of quality of the primary communication path above the predefined threshold. By detecting such restoration, the particular bypass-capable communication node at which restoration occurs can be classified as no longer being a point of failure. In embodiments, the optical switching module further can be configured to switch the bypass-capable communication node from use of the communication node bypass circuitry to use of the communication node primary circuitry responsive to receipt of the second trigger event signal, thereby to restore communication between the main site communication node and the remote site communication node via the primary communication path. For example, restoration of quality of the primary communication path above the predefined threshold can include one or more of (i) restoration of communication node primary circuitry function above the predefined functional threshold, and (ii) restoration of bypass-capable communication node power above the predefined power threshold.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are not to be considered limiting of the invention's scope as the invention comprises other effective embodiments.

DETAILED DESCRIPTION OF THE INVENTION

So that the manner in which the features and advantages of various embodiments of the present invention may be understood in more detail, a more particular description of embodiments of the present invention briefly summarized above may be had by reference to the drawings and the following detailed description. It is to be noted, however, that the drawings illustrate, and the detailed description describes, only various embodiments and, therefore, are not to be considered limiting of the embodiments of the present invention's scope as the invention includes other effective embodiments as well.

Figure 1:
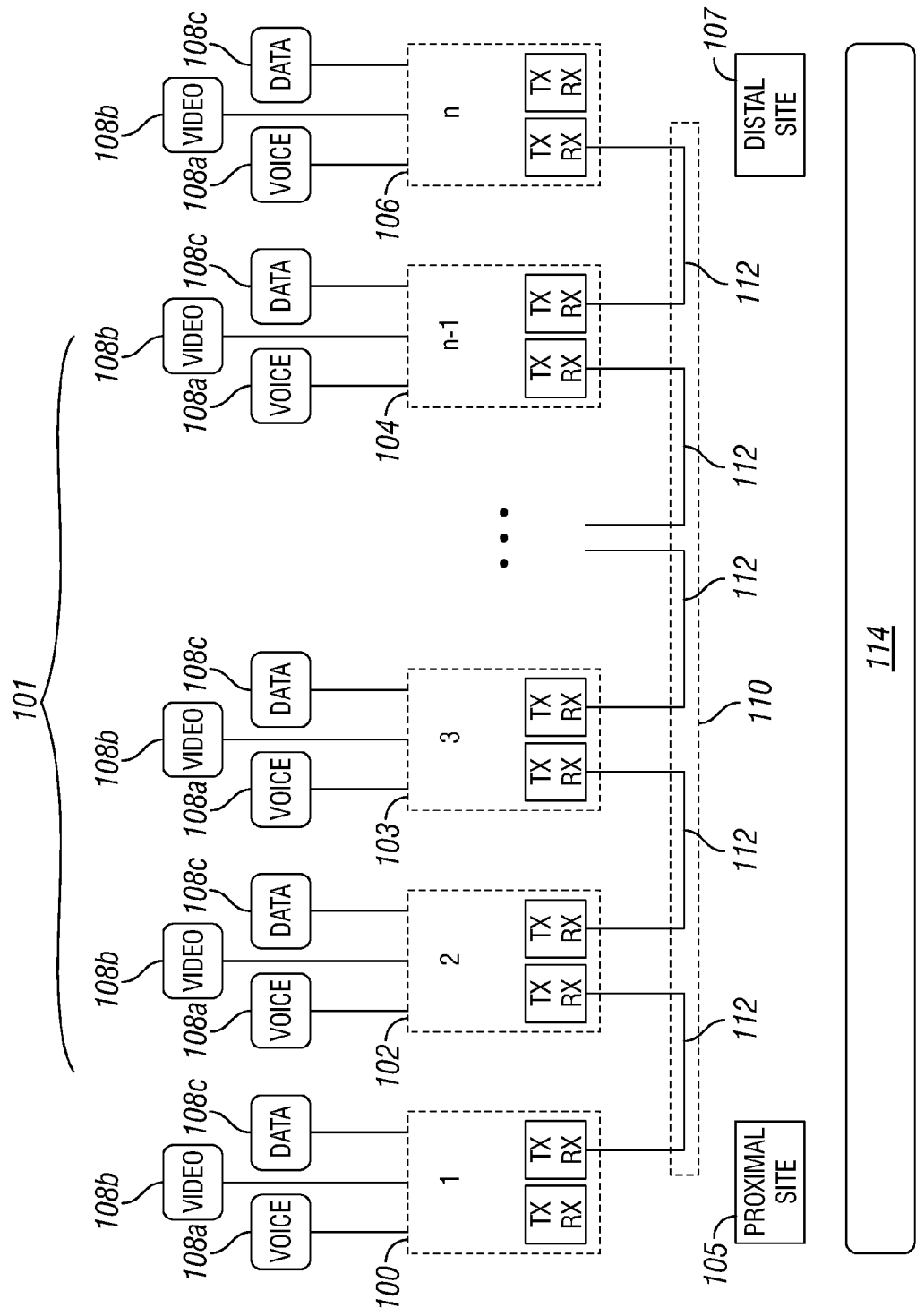
FIG. 1 is a schematic diagram of a system that depicts communication nodes arranged in a daisy chain network according to an embodiment of the invention.

FIG. 1 illustrates an exemplary embodiment of the invention. As shown in FIG. 1, embodiments of the invention include a system for protecting against points of failure in a daisy chain network 101. The daisy chain network 101 can be deployed along a linear facility 114 between a proximal site 105 and a distal site 107. The linear facility 114 can include a pipeline, a power transmission line, or other linear facilities as will be understood by one skilled in the art. Moreover, the term "linear" as used herein does not mandate a geometric line, but can include such a line as well as other facilities along which a daisy chain network or cascaded network can be deployed, as will be understood by one skilled in the art. Likewise, the daisy chain network 101 can take many configurations with its components connected in a series. For example, embodiments of a system can include a plurality of communication nodes 100, 102, 103, 104, 106 operably connected to one another in the daisy chain network 101 via a fiber optic cable 110. For example, the system can be configured to transmit voice data 108a, video data 108b, or other data 108c. Non-limiting examples of communication nodes 100, 102, 103, 104, 106 include switches, multiplexers, and routers. The fiber optic cable 110 can include fiber optic strands 112 in communication with the plurality of communication nodes 100, 102, 103, 104, 106. Advantageously, embodiments of the invention include two pairs of fiber optic strands 112 operably connected to each communication node. The plurality of communication nodes 100, 102, 103, 104, 106 can include, for example, a main site communication node 100 being positioned at the proximal site 105 and a remote site communication node 106 being positioned at the distal site 107. Again, the distal site 107 can represent multiple distal sites, and each distal site 107 can include a remote site communication node 106. The plurality of communication nodes 100, 102, 103, 104, 106 further can include one or more intermediary communication nodes 102, 103, 104 being positioned in the daisy chain network 101 in a series between the main site communication node 100 and the remote site communication node 106. The one or more intermediary communication nodes 102, 103, 104 can be configured to relay a transmission between the main site communication node 100 and the remote site communication node 106. Each of the communication nodes 100, 102, 103, 104, 106 can be characterized as upstream or downstream from other communication nodes 100, 102, 103, 104, 106. For example, an intermediary communication node 102, 103, 104 positioned between a reference communication node and the remote site communication node 106 can be characterized as upstream from the reference communication node, and an intermediary communication node 102, 103, 104 positioned between the reference communication node and the main site communication node 100 can be characterized as downstream from the reference communication node. In this parlance, in the embodiment depicted in FIG. 1, the remote site communication node 106 is upstream of all other communication nodes 100, 102, 103, 104, and the main site communication node 100 is downstream of all other communication nodes 102, 103, 104, 106. In embodiments, the plurality of intermediary communication nodes 102, 103, 104 can include a bypass-capable communication node 103. Thus, the various properties of a bypass-capable communication node will be discussed with reference to node 103. It will be understood, however, that this is done for descriptive purposes only.

Indeed, it is within the scope of the invention for more than one communication node to have these properties and functions. In embodiments, every node in the daisy chain network 101 can be a bypass-capable communication node. In the illustrative embodiment discussed, however, one bypass-capable communication node 103 is included in the daisy chain network 101.

FIGS. 2A-3B are schematic diagrams depicting various configurations of bypass-capable communication nodes 103', 103" according to various embodiments of the invention. For example, a bypass-capable communication node 103', 103" can include a first transceiver 200a in communication with an adjacent downstream communication node. The adjacent downstream communication node can include one of (i) the main site communication node 100, or (ii) an intermediary communication node downstream 102 from the bypass-capable communication node 103 (FIG. 1). A bypass-capable communication node 103, 103', 103" further can include a second transceiver in communication with an adjacent upstream communication node. The adjacent upstream communication node can include one of (i) the remote site communication node 106, or (ii) an intermediary communication node upstream 104 from the bypass capable communication node 103 (FIG. 1). As shown in FIG. 2-5, a bypass-capable communication node 103', 103" can include communication node primary circuitry 202 configured to execute a node function. For example, if the bypass-capable communication node 103', 103" is a multiplexer, the communication node primary circuitry 202 can be used to convert multiple incoming signals into a single outgoing signal. If the bypass-capable communication node 103', 103" is a switch, the communication node primary circuitry 202 can be used to interrupts an incoming signal or redirect an outgoing signal from one destination to another. If the bypass-capable communication node 103', 103" is a router, the communication node primary circuitry 202 can be used to direct a received data packet along a network. If the bypass-capable communication node 103', 103" is a repeater, the communication node primary circuitry 202 can be used to receive, amplify, and repeat an incoming signal. Other embodiments are within the scope of the invention as well. For example, the bypass-capable communication node 103', 103" can be a source point for data (in instances where the bypass-capable communication node 103', 103" is positioned at the proximal site 105 or in other instances) in which case the communication node primary circuitry 202 can be configured to transmit a data packet. In addition, the bypass-capable communication node 103', 103" can be a destination point for data (in instances where the bypass-capable communication node 103', 103" is positioned at the distal site 107 or in other instances) in which case the communication node primary circuitry 202 can be configured to receive a data packet. It further will be understood that the bypass-capable communication node 103', 103" can be a source point for data, with communication node primary circuitry 202 configured to transmit a data packet, but the bypass-capable communication node 103', 103" can be positioned at the distal site 107. Likewise, the bypass-capable communication node 103', 103" can be a destination point for data, with communication node primary circuitry 202 configured to receive a data packet, but the bypass-capable communication node 103', 103" can be positioned at the proximal site 105. In other words, both power and data can move bi-directionally in the daisy chain network 101. In some configurations, for example, power can move primarily in one direction, while data is returned primarily in the opposite direction. The direction of these transmissions does not limit the configurations allowed for placement of the bypass-capable communication node 103', 103" or the configurations allowed for the communication node primary circuitry 202. As a further example, a full duplex system can allow for the simultaneous transmission of power or data in both directions along the daisy chain network 101. Alternatively, a half-duplex system can allow for power or data to be transmitted only in one direction at a time, with the first transmission in one direction precluding a second transmission in the opposite direction until the first transmission is complete. Again, it will be appreciated by one skilled in the art that these various configurations illustrate exemplary embodiments, as other configurations are within the scope of the invention.

It will be understood by one skilled in the art that the communication node primary circuitry 202 can be used to execute a number of node functions according to various embodiments of the invention, including combinations of those mentioned as well as those within the skill of the art. In addition, it is noted that the term "circuitry," as used herein, does not call for a particular configuration of electronic circuits. Rather, the term "circuitry" encompasses one or more electronic circuits collectively configured to perform a common function. It will be understood by one skilled in the art that the term broadly encompasses any configuration of electronic components arranged to perform such a common function. For example, "circuitry" as used herein, can refer to one or more electronic circuits collectively configured to transmit power, data, or both.

The communication node primary circuitry 202 further can be configured to provide a primary communication path for a transmission segment of the transmission being relayed between the main site communication node 100 and the remote site communication node 106. In embodiments of the invention, the transmission segment can include an inter-nodal transmission. For example, the transmission segment can be a transmission between the adjacent downstream communication node 102 and the adjacent upstream communication node 104 that passes through the bypass-capable communication node 103 during normal operation (FIG. 1). Put another way, in embodiments of the invention, when the bypass-capable communication node 103 functions normally, adjacent communication nodes on either side of the bypass-capable communication node 103 communication with one another through the bypass-capable communication node's primary circuitry 202. As used in this disclosure, the term "adjacent" does not mandate any particular distance, as many ranges are within the scope of the invention. For example, in embodiments of the invention, nodes can be geographically separated and highly dispersed. In embodiments of the invention, two communication nodes are adjacent to one another if no intervening communication node is positioned in series in between them in the daisy chain network 101.

FIGS. 2A-3B further depict exemplary optical-electrical circuitry 204 configured to transform a signal between optical and electrical media. For example, in embodiments, optical-electrical circuitry 204 can transform an optical signal received by one or both of the transceivers 200a, 200b, into an electrical signal to transmit to the communication node primary circuitry 202. In embodiments of the invention, the optical-electrical circuitry 202 further can be configured to transform an electrical signal received from the communication node primary circuitry 202 into an optical signal for transmission by one or both of the transceivers 200a, 200b.

Embodiments of the invention can include communication node bypass circuitry 206, 206" configured to provide a bypass communication path around the bypass-capable communication node 103', 103" for the transmission segment between the adjacent downstream communication node 102 and the adjacent upstream communication node 104. Further, embodiments of the invention can include an optical switch 208, 208' configured to switch the bypass-capable communication node 103', 103" from the communication node primary circuitry 202 to the communication node bypass circuitry 206, 206". Switching can be accomplished through a variety of means. For example, electrical and microelectromechanical systems can be used to operate a switch. In addition, embodiments of the invention include operating the switch via optical filters or by electro-magnetic switching.

Figure 2A:
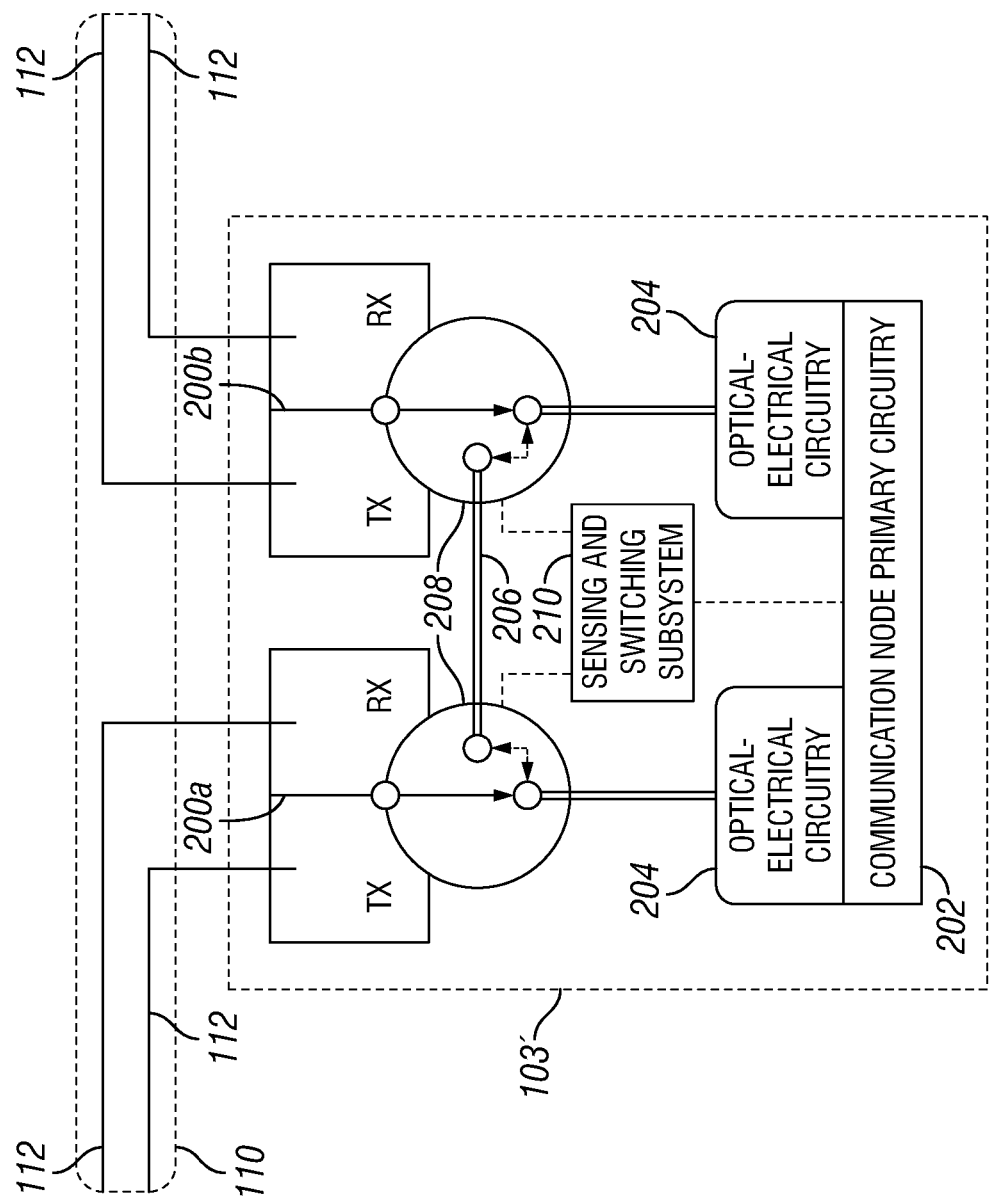
FIG. 2A is a schematic diagram of a communication node that depicts a bypass-capable communication node with internal bypass circuitry not in use according to an embodiment of the invention.
Figure 2B:
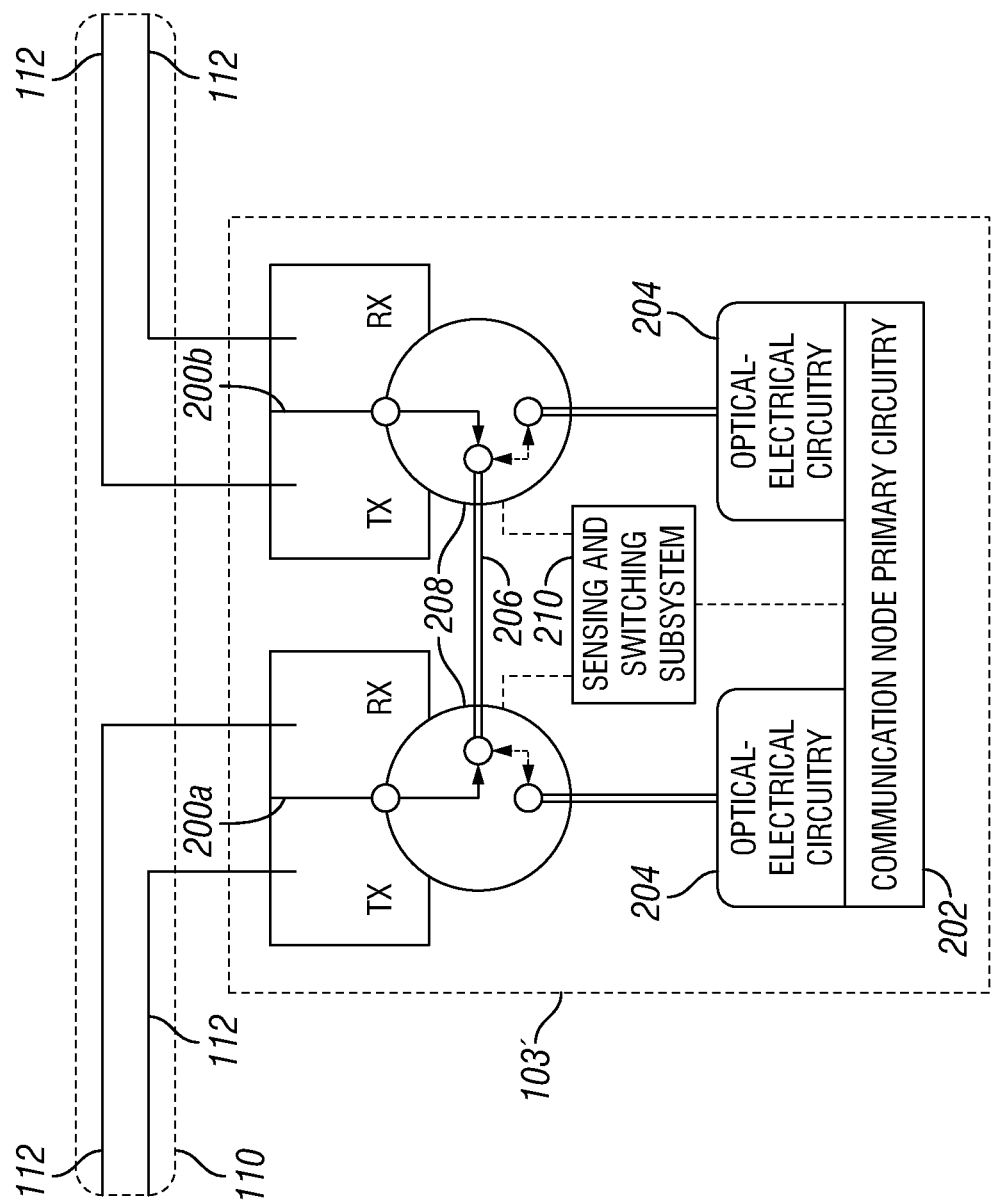
FIG. 2B is a schematic diagram of a communication node that depicts a bypass-capable communication node with internal bypass circuitry in use according to an embodiment of the invention.

According to embodiments of the invention, FIGS. 2A and 2B depict communication node bypass circuitry 206 disposed within a bypass-capable communication node 103'. In addition, an optical switch 208 can refer to multiple optical switches 208 working in conjunction with one another to switch the bypass-capable communication node 103' from use of the communication node primary circuitry 202 to use of the communication node bypass circuitry 206. For example, as shown in FIGS. 2A and 2B, each of the transceivers 200a, 200b can have an optical switch 208 associated therewith. For example, optical switches 208 can be embedded within each transceiver 200a, 200b.

Figure 3A:
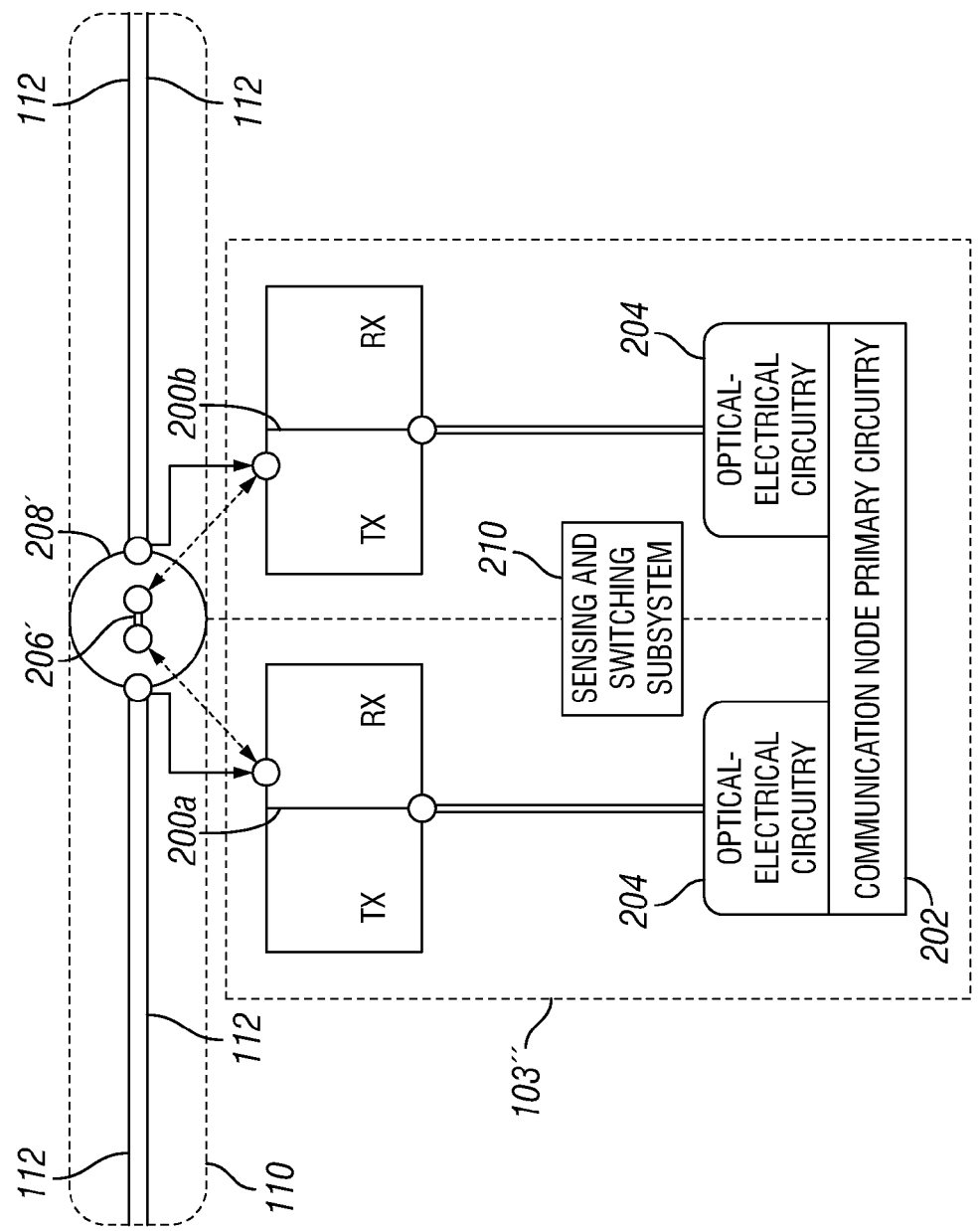
FIG. 3A is a schematic diagram of a communication node that depicts a bypass-capable communication node with external bypass circuitry not in use according to an embodiment of the invention.
Figure 3B:
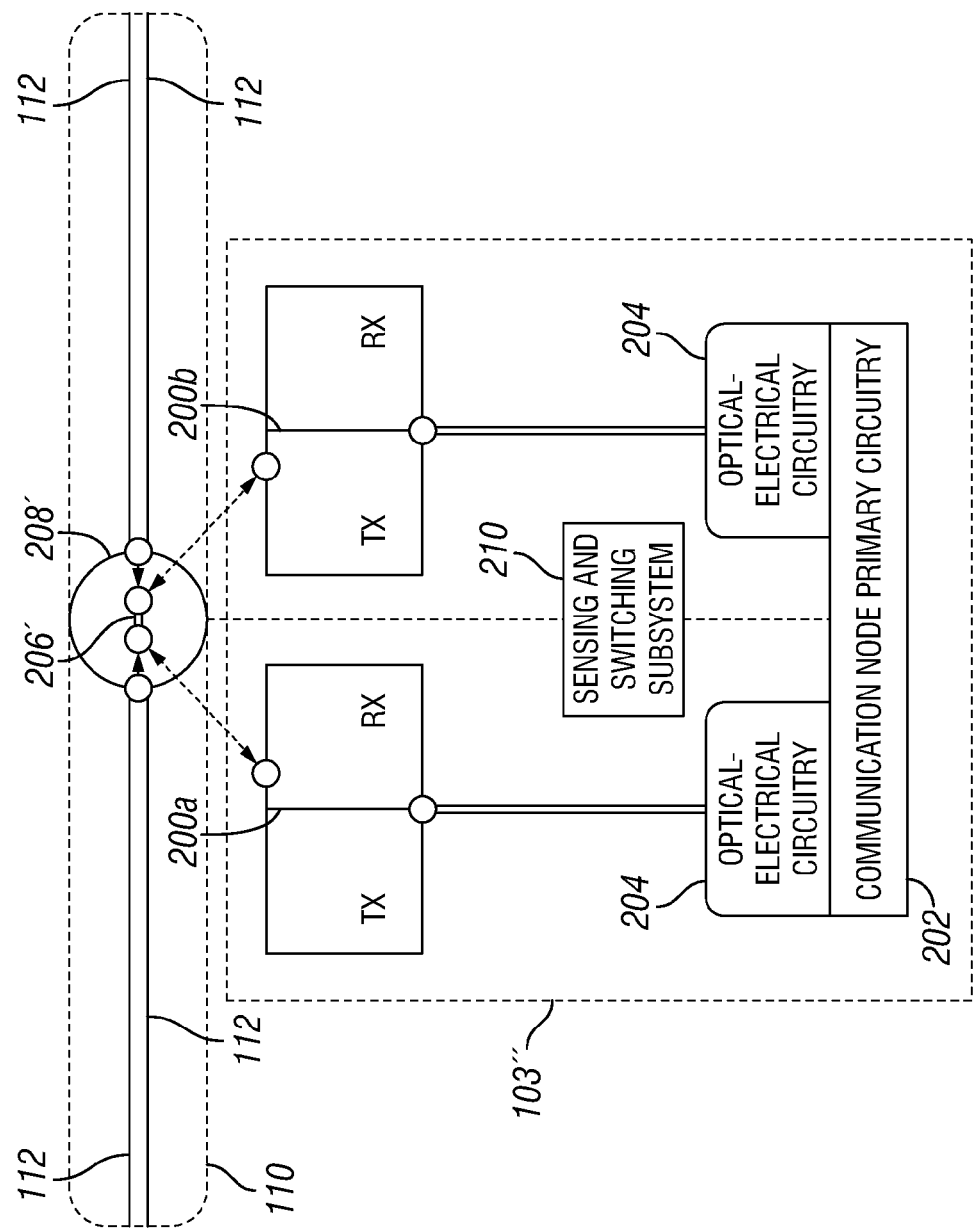
FIG. 3B is a schematic diagram of a communication node that depicts a bypass-capable communication node with external bypass circuitry in use according to an embodiment of the invention.

FIGS. 3A and 3B depict communication node bypass circuitry 206' positioned external to the bypass-capable communication node 103" according to embodiments of the invention. Likewise, the optical switch 208' can be external to the bypass-capable communication node 103". For example, one or both of the communication node bypass circuitry 206' and the optical switch 208' can be embedded in the fiber optic cable 110. For example, fiber optic strands 112 can feed directly into the optical switch 208', as depicted in the exemplary embodiments illustrated in FIGS. 3A and 3B.

Embodiments of the invention can include a sensing and switching subsystem 210 configured to determine the quality of the primary communication path and to make decisions regarding switching between the communication node primary circuitry 202 and the communication node bypass circuitry 206, 206'. The primary communication path relates to the health and functionality of the bypass-capable communication node 103', 103". For example, degradation of quality of the primary communication path below a predefined threshold can include one or more of (i) degradation of communication node primary circuitry function below a predefined functional threshold, and (ii) degradation of bypass-capable communication node power below a predefined power threshold. In addition, restoration of quality of the primary communication path above the predefined threshold can include one or more of (i) restoration of communication node primary circuitry function above the predefined functional threshold, and (ii) restoration of bypass-capable communication node power above the predefined power threshold. The sensing and switching subsystem 210 is illustrated in FIGS. 2A-3B as part of a larger system and in FIG. 4 as a standalone product. It will be understood by one skilled in the art that each of these configurations is within the scope of the invention, as are others.

Figure 4:
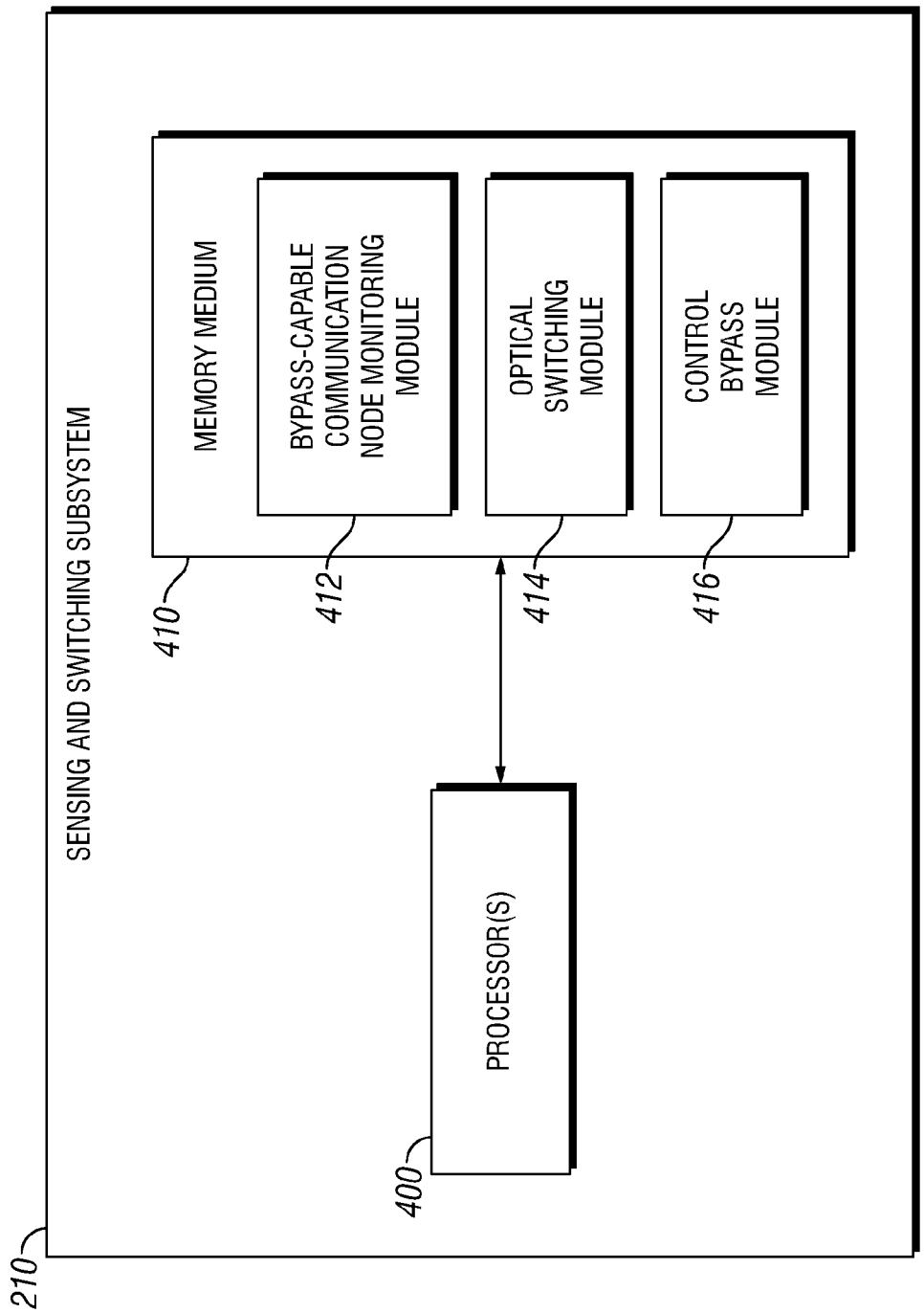
FIG. 4 is a schematic diagram of a sensing and switching subsystem that depicts subsystem components according to an embodiment of the invention.

As illustrated in an exemplary embodiment in FIG. 4, the sensing and switching subsystem 210 can include one or more processors 400. In addition, the sensing and switching subsystem 210 can include tangible computer readable medium 410 in communication with the one or more processors 400. In embodiments of the invention, the sensing and switching subsystem 210 can include a rechargeable battery to serve as a power source for the optical switch 208, 208', the sensing and switching subsystem 210 (FIGS. 2A-3B), or both. Moreover, other independent power sources can be used such that the in-line equipment, such as the communication nodes, are not powered by the same power source that powers the sensing and switching subsystem 210 and optical switches 208, 208'. Such a configuration can provide an independent power source for switching between communication node primary circuitry 202 and communication node bypass circuitry 206, 206', thereby avoiding single or multiple point of power supply failures. Advantageously, such a configuration can avoid a point of failure from power source failures simultaneously affecting both the in-line equipment and switching elements. In embodiments, the sensing and switching subsystem 210 is powered by the same power source that powers the bypass-capable communication node 103', 103". Thus, when power is available, the switching subsystem 210 is excited and functions to route power or data through the communication node primary circuitry 202. When power to the node is lost, however, the sensing and switching subsystem 210 turns off and automatically defaults into a non-excited mode, in which mode the sensing and switching subsystem 210 routes power or data through the communication node bypass circuitry 206, 206'.

The tangible computer readable medium 410 disclosed in this application can have stored therein a plurality of operational modules 412, 414, 416, each of the operational modules 412, 414, 416 comprising a set of instructions that when executed cause the one or more processors to perform operations. Such operations can be executed as part of a computer implemented method, which is also within the scope of embodiments of the invention. It will be understood by one skilled in the art that the tangible computer readable medium 410 can be made and used as a standalone product, as part of a sensing and switching subsystem 210 as shown in the exemplary embodiment of FIG. 4, or in various other configurations.

Figure 5:
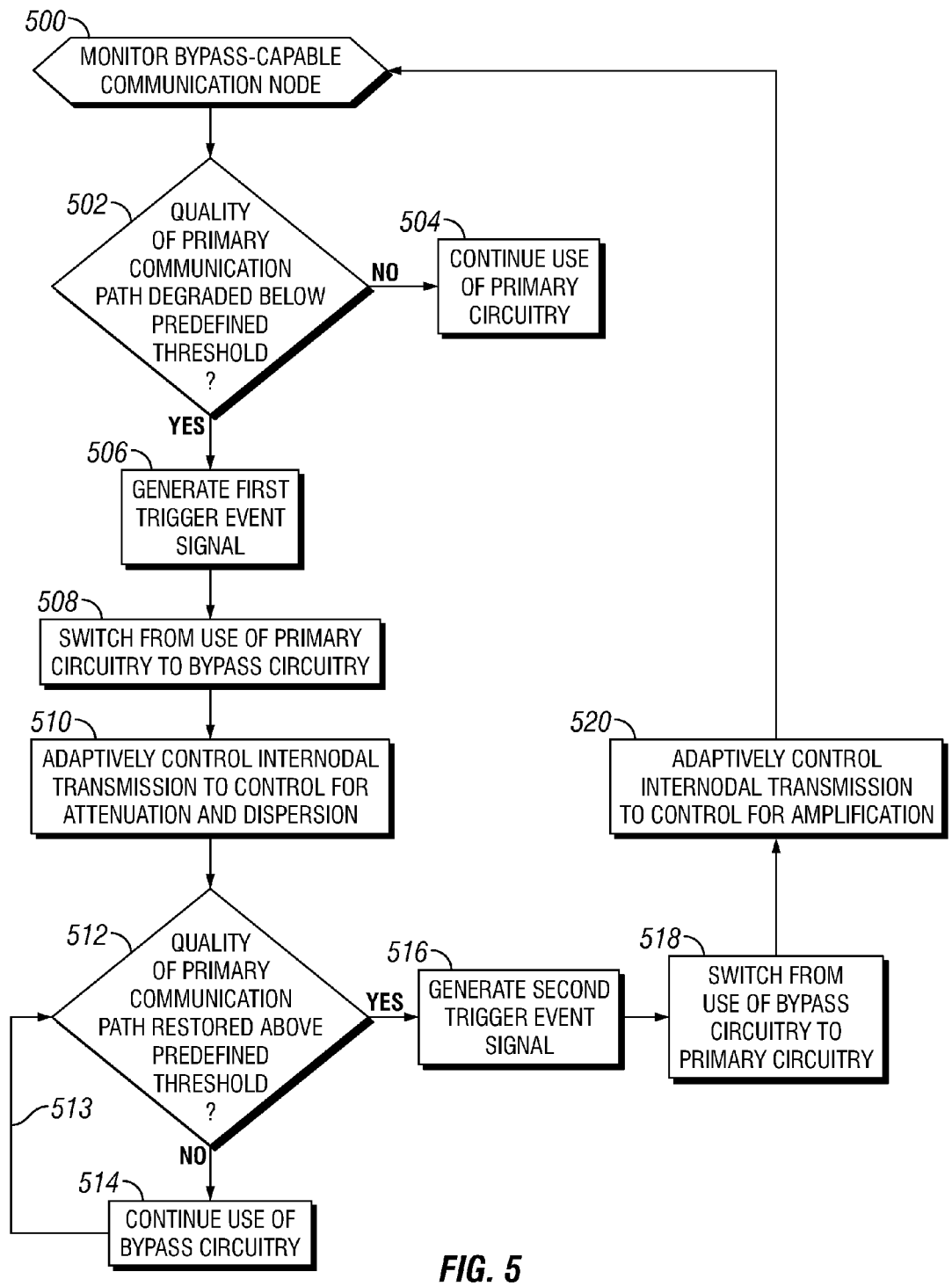
FIG. 5 is a schematic diagram of a method that depicts a flowchart of operations according to an embodiment of the invention.

FIGS. 4 and 5 together depict a plurality of operational modules and exemplary operations that can be executed according to embodiments of the invention. For example, a plurality of operational modules can include a bypass-capable communication node monitoring module 410 configured to monitor the bypass-capable communication node 500 and generate a first trigger event signal 506 responsive to detection of a first trigger event, the first trigger event characterized by degradation of quality of the primary communication path below a predefined threshold 502, thereby to classify the bypass-capable communication node as a point of failure. If the quality of the primary communication path is not degraded below the predefined threshold, the communication node primary circuitry can remain in use 504. Advantageously, monitoring the bypass-capable communication node 500 can include passive monitoring, in which a person is not required to oversee operations.

The plurality of operational modules further can include an optical switching module 414 configured to optically switch the bypass-capable communication node from use of the communication node primary circuitry to use of the communication node bypass circuitry 508 responsive to receipt of the first trigger event signal from the bypass-capable communication node monitoring module 412.

According to embodiments of the invention, the plurality of operational modules further can include a control bypass module 416 responsive to the optical switching module 414 and configured to adaptively control the internodal transmission 510 between the adjacent downstream communication node and the adjacent upstream communication node, when the bypass-capable communication node is classified as a point of failure, thereby to control for attenuation and dispersion caused by bypassing the bypass-capable communication node. In embodiments, the control bypass module can control the transmit power and light or pulse shape of internodal transmissions. Because the effective fiber length between nodes increases when a communication node is bypassed, such an adaptive and coherent bypass process can be used to ensure points of failure do not impact the entire daisy chain network 101.

In embodiments of the invention, the optical switch 208, 208', for example following execution of instructions stored in the optical switching module 414, further can be configured to switch from the communication node bypass circuitry 206, 206' to the communication node primary circuitry 202. In addition, the bypass-capable communication node monitoring module 412 further can be configured to generate a second trigger event signal 516 responsive to detection of a second trigger event. The second trigger event can be characterized by restoration of quality of the primary communication path above the predefined threshold 512, thereby no longer to classify the bypass-capable communication node as a point of failure. If the primary communication path quality is not restored above the predefined threshold, continued use of the bypass circuitry 514 can be appropriate. In embodiments, the optical switching module 414 further can be configured to switch the bypass-capable communication node 103', 103" from use of the communication node bypass circuitry 106, 106' to use of the communication node primary circuitry 202 responsive to receipt of the second trigger event signal 516. In embodiments, the control bypass module 416 further can be configured to adaptively control internodal transmissions when the bypass-capable communication node no longer is classified as a point of failure, thereby to control for amplification caused by restoring communication via the primary communication path.

According to embodiments of the invention, degradation of quality of the primary communication path below a predefined threshold can include one or more of (i) degradation of communication node primary circuitry function below a predefined functional threshold, and (ii) degradation of bypass-capable communication node power below a predefined power threshold. In addition, restoration of quality of the primary communication path above the predefined threshold can include one or more of (i) restoration of communication node primary circuitry function above the predefined functional threshold, and (ii) restoration of bypass-capable communication node power above the predefined power threshold.

As noted above, according to embodiments of the invention, the communication node bypass circuitry 206 and the optical switch 208 can be disposed within the bypass-capable communication node 103' as shown in FIGS. 2A-B. For example, FIG. 2A shows such an exemplary configuration when the communication node bypass circuitry 206 is not in use, and FIG. 2B shows such an exemplary configuration when the communication node bypass circuitry 206 is in use.

In addition, as noted above, in embodiments of the invention, the communication node bypass circuitry 206' and the optical switch 208' can be external to the bypass-capable communication node 103" as shown in FIGS. 3A-B. For example, FIG. 3A shows such an exemplary configuration when the communication node bypass circuitry 206' is not in use, and FIG. 3B shows such an exemplary configuration when the communication node bypass circuitry 206' is in use. In addition, FIGS. 3A-B depict embodiments in which the communication node bypass circuitry 206' and the optical switch 208' are embedded within the fiber optic cable 112 running along the daisy chain network 101.

Advantageously, more than one of the communication nodes in a daisy-chain network 101 can be bypass-capable communication nodes 103, 103', 103". For example, in embodiments of the invention, a plurality of intermediary communication nodes 102, 103, 104 can comprise bypass-capable communication nodes. In other embodiments, all communication nodes in a network can be bypass-capable communication nodes. Moreover, although embodiments of the invention are described with respect to linear network topologies, other network topologies are within the scope of the invention. For example, bypass-capable communication nodes can be used to improve network reliability in linear, daisy chain, tree, and network topologies.

As discussed above with respect to an exemplary system, and discussed here with respect to an exemplary apparatus, FIGS. 2A-3B depict a bypass-capable communication node 103', 103" according to embodiments of the invention. Embodiments of such an apparatus can comprise a first transceiver 200a in communication with an adjacent downstream communication node and a second transceiver 200b in communication with an adjacent upstream communication node. Further, embodiments of a bypass capable communication node 103', 103" can include communication node primary circuitry 202 configured to execute a node function. The communication node primary circuitry 202 further can be configured to provide a primary communication path for a transmission segment. The transmission segment can include or be defined by an intermodal transmission between the adjacent downstream communication node and the adjacent upstream communication node. A bypass-capable communication node 103', 103" further can include optical-electrical circuitry 204 configured to transform an optical signal received by one or more of (i) the first transceiver, and (ii) the second transceiver, into an electrical signal to transmit to the communication node primary circuitry 202. The optical-electrical circuitry 204 further can be configured to transform an electrical signal received from the communication node primary circuitry 202 into an optical signal for transmission by one or more of (i) the first transceiver, and (ii) the second transceiver. Embodiments can include communication node bypass circuitry 206 disposed within the bypass-capable communication node 103' as shown in FIGS. 2A-B. Communication node bypass circuitry 206', however, does not have to be disposed within the bypass-capable communication node 103", as illustrated in FIGS. 3A-B, which depict bypass-capable communication nodes 103" without communication node bypass circuitry 206' disposed internally. The communication node bypass circuitry 206 can be configured to provide a bypass communication path around the bypass-capable communication node 103' for the transmission segment between the adjacent downstream communication node and the adjacent upstream communication node.

As shown in various exemplary embodiments in FIGS. 2A-B, a bypass-capable communication node 103' can include an optical switch 208 configured to switch the bypass-capable communication node 103' from the communication node primary circuitry 202 to the communication node bypass circuitry 206. As shown in FIGS. 2A-B, for example, an optical switch 208 can refer to multiple switches working in conjunction with one another to perform the described operations.

Embodiments of the bypass-capable communication node 103' can include a sensing a switching subsystem 210 configured to determine the quality of the primary communication path and to make decisions regarding switching between the communication node primary circuitry 202 and the communication node bypass circuitry 206. The sensing and switching subsystem 210 is illustrated in FIGS. 2A-B as part of a larger system and in FIG. 4 as a standalone product. The sensing and switching subsystem 210 can include the features of the sensing and switching subsystem 210 as described above with respect to various embodiments of the invention. For example, the sensing and switching subsystem can include one or more processors 400 and tangible computer readable medium 410 in communication with the one or more processors 400. Likewise, the tangible computer readable medium 400 can include the features of the tangible computer readable medium 400 described above with respect to various embodiments of the invention. For example, the tangible computer readable medium 400 can have stored therein a plurality of operational modules, each of the operational modules comprising a set of instructions that when executed cause the one or more processors to perform operations. The plurality of operational modules can include a bypass-capable communication node monitoring module 412 configured to monitor the bypass-capable communication node 500 and generate a first trigger event signal 506 responsive to detection of a first trigger event. According to embodiments of the invention, the first trigger event can be characterized by degradation of quality of the primary communication path below a predefined threshold, thereby to classify the bypass-capable communication node as a point of failure.

The plurality of operational modules further can include an optical switching module 414 configured to optically switch the bypass-capable communication node from use of the communication node primary circuitry to use of the communication node bypass circuitry 508 responsive to receipt of the first trigger event signal from the bypass-capable communication node monitoring module 412.

According to embodiments of the invention, the plurality of operational modules further can include a control bypass module 416 responsive to the optical switching module 414 and configured to adaptively control the internodal transmission 510 between the adjacent downstream communication node and the adjacent upstream communication node, when the bypass-capable communication node is classified as a point of failure, thereby to control for attenuation and dispersion caused by bypassing the bypass-capable communication node. In embodiments, the control bypass module can control the transmit power and light or pulse shape of internodal transmissions. Because the effective fiber length between nodes increases when a communication node is bypassed, such an adaptive and coherent bypass process can be used to ensure points of failure do not impact the entire daisy chain network 101.

As shown in exemplary embodiments of a bypass-capable communication node 103' in FIGS. 2A-B, and in steps of an exemplary computer implemented method in FIG. 5, in embodiments of the invention, the optical switch 208 further can be configured to switch from the communication node bypass circuitry 206 to the communication node primary circuitry 202. In addition, the bypass-capable communication node monitoring module 412 further can be configured to generate a second trigger event signal 516 responsive to detection of a second trigger event. The second trigger event can be characterized by restoration of quality of the primary communication path above the predefined threshold 512, thereby no longer to classify the bypass-capable communication node as a point of failure. If the primary communication path quality is not restored above the predefined threshold, continued use of the bypass circuitry 514 can be appropriate. During the continued use of bypass circuitry 514, however, there can be repeated checks 513 as to whether the quality of the primary communication path has been restored above the predefined threshold 512. In embodiments, the optical switching module 414 further can be configured to switch the bypass-capable communication node 103', 103" from use of the communication node bypass circuitry 106, 106' to use of the communication node primary circuitry 202 responsive to receipt of the second trigger event signal 516. In embodiments, the control bypass module 416 further can be configured to adaptively control internodal transmissions when the bypass-capable communication node no longer is classified as a point of failure, thereby to control for amplification caused by restoring communication via the primary communication path.

According to embodiments of the invention, degradation of quality of the primary communication path below a predefined threshold can include one or more of (i) degradation of communication node primary circuitry function below a predefined functional threshold, and (ii) degradation of bypass-capable communication node power below a predefined power threshold. In addition, restoration of quality of the primary communication path above the predefined threshold can include one or more of (i) restoration of communication node primary circuitry function above the predefined functional threshold, and (ii) restoration of bypass-capable communication node power above the predefined power threshold.

FIG. 4 is a schematic diagram of a sensing and switching subsystem 210, including an associated tangible computer readable memory medium 410. Features of the tangible computer readable memory medium 410 have been discussed herein with respect to various embodiments of the invention. For example, features of the tangible computer readable memory medium 410 have been discussed with respect to the embodiments of various systems and apparatuses. As noted in those discussions, it is within the scope of the invention to make and use the tangible computer readable memory medium as a standalone product.

FIG. 5 is a schematic diagram of a computer implemented method and associated operations according to an exemplary embodiment. In various embodiments, steps of the method can include monitoring a bypass-capable communication node 500. The bypass-capable communication node can include (i) communication node primary circuitry providing a primary communication path for an internodal transmission between an adjacent downstream communication node and an adjacent upstream communication node, and (ii) communication node bypass circuitry providing a bypass communication path between the adjacent downstream communication node and the adjacent upstream communication node. The bypass-capable communication node further can provide communication and networking connectivity for one or more communication or computing systems available at an access site or repeater site. The access or repeater site, for example, can be the site of the bypass-capable communication node 103 as shown, for example, in FIG. 1. Indeed, voice, video, and data applications can communication using such connectivity. For example, the bypass-capable communication node disclosed with respect to embodiments of the computer implemented method can have features of the bypass-capable communication node 103, 103', 103" disclosed above in this specification.

In embodiments, the steps of the computer implemented method further can include determining whether the quality of the communication node primary path has been degraded below a predefined threshold 502. If the quality of the communication node primary path has not been degraded below the predefined threshold, the method can include the step of continuing to use the communication node primary circuitry 504. If the quality of the communication node primary path has been degraded below the predefined threshold, the method can include the step of generating a first trigger event signal, thereby to classify the bypass-capable communication node as a point of failure 506. The method further can include switching the bypass-capable communication node from use of the communication node primary circuitry to use of the communication node bypass circuitry when the first trigger event signal is sensed 508.

Embodiments of the method further can include adaptively controlling the internodal transmission when the bypass-capable communication node is classified as a point of failure, thereby to control for attenuation and dispersion caused by bypassing the bypass-capable communication node 510. In embodiments, the method further can include determining whether the quality of the communication node primary path has been restored above the predefined threshold 512. If the quality of the communication node primary path has not been restored above the predefined threshold, the method further can include continuing to use the communication node bypass circuitry 514. During the continued use of bypass circuitry 514, however, there can be repeated checks 513 as to whether the quality of the primary communication path has been restored above the predefined threshold 512. If the quality of the communication node primary path has been restored above the predefined threshold, the method further can include generating a second trigger event signal, thereby no longer to classify the bypass-capable communication node as a point of failure 516. In embodiments, the method can include switching the bypass-capable communication node from use of the communication node bypass circuitry to use of the communication node primary circuitry 518 when the second trigger event signal is sensed. In addition, embodiments of the method can include adaptively controlling the internodal transmission when the bypass-capable communication node no longer is classified as a point of failure, thereby to control for amplification of the internodal transmission caused by no longer bypassing the bypass-capable communication node 520. According to embodiments of the invention, the method can include continuing to monitor the bypass-capable communication node 500.

In embodiments, monitoring the bypass-capable communication node 500, at any stage, can providing a dedicated component to receive data from one or more sensors, analyzing the data, and generating the first trigger event 506 and the second trigger event 516 responsive to analyzing the data. The dedicated component can include software, hardware, or some combination of software and hardware. For example, it can be a part of the sensing and switching subsystem. In addition, monitoring the bypass-capable communication node 500 can include providing one or more sensors to generate the first trigger event 506 and the second trigger event 516 responsive to data sensed by the one or more sensors. For example, the trigger events can be generated directly in response to sensed data, even in the absence of a dedicated component to analyze the data. Further, monitoring the bypass-capable communication node 500 can include detecting the excitation or de-excitation generated by the availability or loss of power respectively and generating the first trigger event and second trigger event accordingly. It will be understood by one skilled in the art that monitoring the bypass-capable communication node 500 can include some combination of these methods as well.

In the various embodiments of the invention described herein, a person having ordinary skill in the art will recognize that various types of memory are readable by a computer, such as the memory described herein in reference to the various computers, e.g., computer, computer server, web server, microcontroller, system-on-chip, application-specific integrated circuit, or other computers with embodiments of the present invention. Examples of computer-readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems, apparatuses, computer media, and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. Embodiments of the present invention have been described in considerable detail with specific reference to illustrated embodiments. It will be apparent, however, that various modifications and changes can be made within the spirit and scope of the embodiments of the present invention as described in the foregoing specification, and such modifications and changes are to be considered equivalents and part of this disclosure. Moreover, it is noted that various features of the invention described with respect to certain embodiments are to be imputed to other embodiments as well unless specifically stated otherwise.

That claimed is:

1. A system for protecting against points of failure in a daisy-chain network, the daisy-chain network deployed along a linear facility between a proximal site and a distal site, the system comprising:
 a daisy-chain network comprising a plurality of communication nodes operably connected to one another in a daisy-chain linear topology via a fiber optic cable, the plurality of communication nodes including:
  a main site communication node being positioned at the proximal site,
  a remote site communication node being positioned at the distal site,
  one or more intermediary communication nodes being positioned in the daisy-chain network in a series between the main site communication node and the remote site communication node, the one or more intermediary communication nodes configured to relay a transmission between the main site communication node and the remote site communication node, an intermediary communication node of the one or more intermediary communication nodes positioned between a reference communication node and the remote site communication node being characterized as upstream from the reference communication node and an intermediary communication node of the one or more intermediary communication nodes positioned between the reference communication node and the main site communication node being characterized as downstream from the reference communication node, the one or more intermediary communication nodes including a bypass-capable communication node, the bypass-capable communication node including:
   a first transceiver in communication with an adjacent downstream communication node, the adjacent downstream communication node including one of (i) the main site communication node, or (ii) an intermediary communication node downstream from the bypass-capable communication node,
   a second transceiver in communication with an adjacent upstream communication node, the adjacent upstream communication node including one of (i) the remote site communication node, or (ii) an intermediary communication node upstream from the bypass capable communication node,
   communication node primary circuitry configured to execute a node function, the communication node primary circuitry further configured to provide a primary communication path for a transmission segment of the transmission being relayed between the main site communication node and the remote site communication node, the transmission segment including an internodal transmission between the adjacent downstream communication node and the adjacent upstream communication node, and
   optical-electrical circuitry configured to transform an optical signal received by one or more of (i) the first transceiver, and (ii) the second transceiver, into an electrical signal and to transmit the electrical signal to the communication node primary circuitry, the optical-electrical circuitry further configured to transform an electrical signal received from the communication node primary circuitry into an optical signal for transmission by one or more of (i) the first transceiver, and (ii) the second transceiver;
  communication node bypass circuitry configured to provide a bypass communication path around the bypass-capable communication node for the transmission segment between the adjacent downstream communication node and the adjacent upstream communication node;
  an optical switch configured to switch the bypass-capable communication node from the communication node primary circuitry to the communication node bypass circuitry;
 one or more processors; and tangible computer readable medium in communication with the one or more processors, the tangible computer readable medium having stored therein a plurality of operational modules, each of the operational modules comprising a set of instructions that when executed cause the one or more processors to perform operations, the plurality of operational modules including:

a bypass-capable communication node monitoring module configured to:

monitor the bypass-capable communication node to determine whether a quality of the primary communication path is below a predefined threshold quality level; and generate, in response to determining that the quality of the primary communication path is below the predefined threshold quality level, a first trigger event signal;

an optical switching module configured to, in response to receipt of the first trigger event signal from the bypass-capable communication node monitoring module, control the optical switch to switch the bypass-capable communication node from use of the communication node primary circuitry to use of the communication node bypass circuitry, and a control bypass module configured to, during use of the communication node bypass circuitry, adaptively control internodal transmissions between the adjacent downstream communication node and the adjacent upstream communication node to account for attenuation and dispersion caused by bypassing the bypass-capable communication node.

2. The system of claim 1, wherein the transmission includes one or more of (i) a power transmission, and (ii) a data transmission.

3. The system of claim 2, wherein the optical switch is further configured to switch from the communication node bypass circuitry to the communication node primary circuitry, wherein the bypass-capable communication node monitoring module further is configured to generate, in response to determining that the quality of the primary communication path is at or above the predefined threshold quality level, a second trigger event signal, wherein the optical switching module further is configured to, in response to receipt of the second trigger event signal from the bypass-capable communication node monitoring module, control the optical switch to switch the bypass-capable communication node from use of the communication node bypass circuitry to use of the communication node primary circuitry, and wherein the control bypass module further is configured to, during use of the communication node primary circuitry, adaptively control internodal transmissions to account for amplification caused by restoring communication via the primary communication path.

4. The system of claim 3, wherein determining that the quality of the primary communication path is below the predefined threshold quality level comprises determining one or both of (i) a communication node primary circuitry function below a predefined functional threshold, and (ii) a bypass-capable communication node power below a predefined power threshold; and wherein determining that the quality of the primary communication path is at or above the predefined threshold quality level comprises determining (i) the communication node primary circuitry function at or above the predefined functional threshold, and (ii) the bypass-capable communication node power at or above the predefined power threshold.

5. The system of claim 4, wherein the communication node bypass circuitry and the optical switch are disposed within the bypass-capable communication node.

6. The system of claim 4, wherein the communication node bypass circuitry and the optical switch are external to the bypass-capable communication node.

7. The system of claim 6, wherein the communication node bypass circuitry and the optical switch are disposed within the fiber optic cable.

8. The system of claim 4, wherein a plurality of intermediary communication nodes comprise bypass-capable communication nodes.

9. The system of claim 1, wherein the adaptively controlling internodal transmissions between the adjacent downstream communication node and the adjacent upstream communication node to account for attenuation and dispersion caused by bypassing the bypass-capable communication node comprises controlling one or more of power, light and pulse shape on the internodal transmissions between the adjacent downstream communication node and the adjacent upstream communication node to account for attenuation and dispersion caused by bypassing the bypass-capable communication node.

10. The system of claim 1, wherein monitoring the bypass-capable communication node to determine whether a quality of the primary communication path is below a predefined threshold quality level comprises monitoring the bypass-capable communication node to determine whether a node power of the bypass-capable communication node is below a predefined power threshold, and wherein generating the first trigger signal comprises generating the first trigger event signal in response to determining that the node power of the bypass-capable communication node is below the predefined power threshold, such that the optical switching module is configured to switch the bypass-capable communication node from use of the communication node primary circuitry to use of the communication node bypass circuitry responsive to a determination that the node power of the bypass-capable communication node is below the predefined power threshold.

11. The system of claim 1, wherein monitoring the bypass-capable communication node to determine whether a quality of the primary communication path is below a predefined threshold quality level comprises monitoring the bypass-capable communication node to determine whether a circuitry function of the bypass-capable communication node is below a predefined functional threshold, and wherein generating the first trigger signal comprises generating the first trigger event signal in response to determining that the circuitry function of the bypass-capable communication node is below the predefined functional threshold, such that the optical switching module is configured to switch the bypass-capable communication node from use of the communication node primary circuitry to use of the communication node bypass circuitry responsive to a determination that the circuitry function of the bypass-capable communication node is below the predefined functional threshold.

12. A bypass-capable communication node system comprising:

a first transceiver in communication with an adjacent downstream communication node;

19 a second transceiver in communication with an adjacent upstream communication node;

communication node primary circuitry configured to execute a node function, the communication node primary circuitry further configured to provide a primary communication path for a transmission segment, the transmission segment including an internodal transmission between the adjacent downstream communication node and the adjacent upstream communication node;

optical-electrical circuitry configured to transform an optical signal received by one or more of (i) the first transceiver, and (ii) the second transceiver, into an electrical signal and to transmit the electrical signal to the communication node primary circuitry, the optical-electrical circuitry further configured to transform an electrical signal received from the communication node primary circuitry into an optical signal for transmission by one or more of (i) the first transceiver, and (ii) the second transceiver;

communication node bypass circuitry configured to provide a bypass communication path around the bypass-capable communication node for the transmission segment between the adjacent downstream communication node and the adjacent upstream communication node;

an optical switch configured to switch the bypass-capable communication node from the communication node primary circuitry to the communication node bypass circuitry;

one or more processors; and non-transitory computer readable storage medium in communication with the one or more processors, the non-transitory computer readable storage medium having stored therein a plurality of operational modules, each of the operational modules comprising a set of instructions that when executed cause the one or more processors to perform operations, the plurality of operational modules including:

a bypass-capable communication node monitoring module configured to:

monitor the bypass-capable communication node to determine whether a quality of the primary communication path is below a predefined threshold quality level; and generate, in response to determining that the quality of the primary communication path is below the predefined threshold quality level, a first trigger event signal;

an optical switching module configured to, in response to receipt of the first trigger event signal from the bypass-capable communication node monitoring module, control the optical switch to switch the bypass-capable communication node from use of the communication node primary circuitry to use of the communication node bypass circuitry, and a control bypass module configured to, during use of the communication node bypass circuitry, adaptively control internodal transmissions between the adjacent downstream communication node and the adjacent upstream communication node to account for attenuation and dispersion caused by bypassing the bypass-capable communication node.

13. The system of claim 12, wherein the optical switch is further configured to switch from the communication node bypass circuitry to the communication node primary circuitry,

20 wherein the bypass-capable communication node monitoring module further is configured to generate, in response to determining that the quality of the primary communication path is at or above the predefined threshold quality level, a second trigger event signal, wherein the optical switching module further is configured to, in response to receipt of the second trigger event signal from the bypass-capable communication node monitoring module, control the optical switch to switch the bypass-capable communication node from use of the communication node bypass circuitry to use of the communication node primary circuitry; and wherein the control bypass module further is configured to, during use of the communication node primary circuitry, adaptively control internodal transmissions to account for amplification caused by restoring communication via the primary communication path.

14. The system of claim 13, wherein determining that the quality of the primary communication path is below the predefined threshold quality level comprises determining one or both of (i) a communication node primary circuitry function below a predefined functional threshold, and (ii) a bypass-capable communication node power below a predefined power threshold; and wherein determining that the quality of the primary communication path is at or above the predefined threshold quality level comprises determining (i) the communication node primary circuitry function at or above the predefined functional threshold, and (ii) the bypass-capable communication node power at or above the predefined power threshold.

15. Non-transitory computer readable storage medium in communication with one or more processors, the non-transitory computer readable storage medium having stored therein a plurality of operational modules, each of the operational modules comprising a set of instructions that when executed cause the one or more processors to perform operations, the plurality of operational modules including:

a bypass-capable communication node monitoring module configured to:

monitor a bypass-capable communication node to determine whether a quality of a primary communication path is below a predefined threshold quality level; and generate, in response to determining that the quality of the primary communication path is below the predefined threshold quality level, a first trigger event signal;

an optical switching module configured to, in response to receipt of the first trigger event signal from the bypass-capable communication node monitoring module, control the optical switch to optically switch the bypass-capable communication node from use of a communication node primary circuitry to use of a communication node bypass circuitry, the communication node primary circuitry configured to a primary communication path for an internodal transmission between an adjacent downstream communication node and an adjacent upstream communication node, and the communication node bypass circuitry configured to provide a bypass communication path between the adjacent downstream communication node and the adjacent upstream communication node; and a control bypass module configured to, during use of the communication node bypass circuitry, adaptively control internodal transmissions between the adjacent downstream communication node and the adjacent upstream communication node to account for attenuation and dispersion caused by bypassing the bypass-capable communication node.

16. The medium of claim 15,
wherein the bypass-capable communication node monitoring module further is configured to generate, in response to determining that the quality of the primary communication path is at or above the predefined threshold quality level, a second trigger event signal,
wherein the optical switching module further is configured to, in response to receipt of the second trigger event signal from the bypass-capable communication node monitoring module, control the optical switch to switch the bypass-capable communication node from use of the communication node bypass circuitry to use of the communication node primary circuitry, and
wherein the control bypass module further is configured to, during use of the communication node primary circuitry, adaptively control internodal transmissions to account for amplification caused by restoring communication via the primary communication path.

17. The medium of claim 16,
wherein determining that the quality of the primary communication path is below the predefined threshold quality level comprises determining one or both of (i) a communication node primary circuitry function below a predefined functional threshold, and (ii) a bypass-capable communication node power below a predefined power threshold; and
wherein determining that the quality of the primary communication path is at or above the predefined threshold quality level comprises determining (i) the communication node primary circuitry function at or above the predefined functional threshold, and (ii) the bypass-capable communication node power at or above the predefined power threshold.

18. A method comprising:
monitoring a bypass-capable communication node to determine whether a quality of a primary communication path is below a predefined threshold quality level, the bypass-capable communication node including (i) communication node primary circuitry providing a primary communication path for an internodal transmission between an adjacent downstream communication node and an adjacent upstream communication node, and (ii) communication node bypass circuitry providing a bypass communication path between the adjacent downstream communication node and the adjacent upstream communication node; and
in response to determining that the quality of the primary communication path is below the predefined threshold switching the bypass-capable communication node from use of the communication node primary circuitry to use of the communication node bypass circuitry to communicate internodal transmission between the adjacent downstream communication node and the adjacent upstream communication node via the communication node bypass circuitry.

19. The method of claim 18, further comprising:
during use of the communication node bypass circuitry, adaptively controlling internodal transmissions to account for attenuation and dispersion caused by bypassing the bypass-capable communication node.

20. The method of claim 19, further comprising:
in response to determining that the quality of the primary communication path is at or above the predefined threshold
switching the bypass-capable communication node from use of the communication node bypass circuitry to use of the communication node primary circuitry to communicate internodal transmission between the adjacent downstream communication node and the adjacent upstream communication node via the communication node primary circuitry; and
during use of the communication node primary circuitry, adaptively controlling internodal transmissions to account for amplification of the internodal transmissions caused by communication via the primary communication path.

21. The method of claim 20, wherein monitoring the bypass-capable communication node includes:
receiving data from one or more sensors monitoring the primary communication path;
analyzing the data to determining the quality of the primary communication path;
generating, in response to determining that the quality of the primary communication path is below the predefined threshold, a first trigger event to induce the switching of the bypass-capable communication node to use of the communication node bypass circuitry; and
generating, in response to determining that the quality of the primary communication path is at or above the predefined threshold, a second trigger event to induce the switching of the bypass-capable communication node to use of the communication node primary circuitry.

22. A system comprising:
a linear facility comprising a plurality of communication nodes communicatively coupled to one another via fiber optic cables, the plurality of communication nodes configured in a linear daisy-chain topology comprising one or more intermediary nodes arranged in series between a first of the plurality of communication nodes located at a first end of the daisy-chain topology and a second of the plurality of communication nodes located at a second end of the daisy-chain topology, one or more of the intermediary nodes comprising:
a first transceiver communicatively coupled to an adjacent downstream communication node of the plurality of communication nodes, the first transceiver configured to send and receive communications between the intermediary node and the adjacent downstream communication node via a first fiber optic cable extending between the intermediary node and the adjacent downstream communication node;
a second transceiver communicatively coupled to an adjacent upstream communication node of the plurality of communication nodes, the second transceiver configured to send and receive communications between the intermediary node and the adjacent upstream communication node via a second fiber optic cable extending between the intermediary node and the adjacent downstream communication node;
communication node circuitry configured to execute a node function;
a primary communication circuit configured to provide a first path between the adjacent downstream communication node and the adjacent upstream communication node, the first path comprising the first transceiver, the second transceiver and the communication node circuitry;

a bypass communication circuit configured to provide a second path between the adjacent downstream communication node and the adjacent upstream communication node, the second path not comprising the communication node circuitry; and a switching system configured to:
monitor the primary communication circuitry to determine whether a quality of the first path is below a predefined threshold quality level;

in response to determining that the quality of the first path is not below the predefined threshold quality level, controlling the intermediary node to route transmissions via the first path of the primary communication circuit; and in response to determining that the quality of the first path is below the predefined threshold quality level, controlling the intermediary node to route transmissions via the second path of the bypass communication circuit.

23. The system of claim 22, wherein controlling the intermediary node to route transmissions via the second path of the bypass communication circuit comprises adaptively controlling the transmissions between the adjacent downstream communication node and the adjacent upstream communication node to account for attenuation and dispersion caused by routing transmissions via the second path.

24. The system of claim 23, wherein the adaptively controlling the transmissions between the adjacent downstream communication node and the adjacent upstream communication node to account for attenuation and dispersion caused by bypassing the bypass-capable communication node comprises controlling one or more of power, light and pulse shape on the transmissions between the adjacent downstream communication node and the adjacent upstream communication node to account for attenuation and dispersion caused by bypassing the bypass-capable communication node.

25. The system of claim 22, wherein the linear daisy-chain topology comprises the first of the plurality of communication nodes and the second of the plurality of communication nodes indirectly communicatively coupled to one another via the one or more intermediary nodes, and wherein the first of the plurality of communication nodes and the second of the plurality of communication nodes are not directly communicatively coupled to one another.

26. The system of claim 22, wherein monitoring the primary communication circuitry to determine whether a quality of the first path is below a predefined threshold quality level comprises monitoring the primary communication circuitry to determine whether a node power of the primary communication circuitry is below a predefined power threshold such that the intermediary node is controlled to route transmissions via the first path of the primary communication circuit responsive to determining that the node power of the primary communication circuitry is not below the predefined power threshold and the intermediary node is controlled to route transmissions via the second path of the primary communication circuit responsive to determining that the node power of the primary communication circuitry is below the predefined power threshold.

27. The system of claim 22, wherein monitoring the primary communication circuitry to determine whether a quality of the first path is below a predefined threshold quality level comprises monitoring the primary communication circuitry to determine whether the node function of the communication node circuitry is below a predefined functional threshold such that the intermediary node is controlled to route transmissions via the first path of the primary communication circuit responsive to determining that the node function of the communication node circuitry is not below the predefined functional threshold and the intermediary node is controlled to route transmissions via the second path of the primary communication circuit responsive to determining that the node function of the communication node circuitry is below the predefined functional threshold.

* * * * *